United States Patent
Lund et al.

(10) Patent No.: US 9,642,051 B2
(45) Date of Patent: May 2, 2017

(54) METHOD AND APPARATUS FOR PROVIDING NOTIFICATION OF A NETWORK ACCESS TECHNOLOGY SWITCHING EVENT

(75) Inventors: Tatu Juhana Lund, Paimio (FI); Teemu Ilmari Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 5 days.

(21) Appl. No.: 14/403,336

(22) PCT Filed: May 30, 2012

(86) PCT No.: PCT/IB2012/052725
§ 371 (c)(1),
(2), (4) Date: Nov. 24, 2014

(87) PCT Pub. No.: WO2013/179092
PCT Pub. Date: Dec. 5, 2013

(65) Prior Publication Data
US 2015/0172968 A1    Jun. 18, 2015

(51) Int. Cl.
*H04W 12/08* (2009.01)
*H04W 36/00* (2009.01)
(Continued)

(52) U.S. Cl.
CPC ... *H04W 36/0066* (2013.01); *H04M 1/72577* (2013.01); *H04W 12/08* (2013.01); *H04W 88/06* (2013.01)

(58) Field of Classification Search
CPC . H04W 36/00; H04W 36/0066; H04W 88/06; H04W 12/08; H04M 1/725; H04M 1/72577
(Continued)

(56) References Cited

U.S. PATENT DOCUMENTS

2007/0183374 A1* 8/2007 Classon ............ H04W 36/0083
370/338
2007/0189256 A1* 8/2007 Oh ........................ H04W 74/06
370/338
(Continued)

FOREIGN PATENT DOCUMENTS

EP    1701572 A2    9/2006
EP    2252115 A1    11/2010
(Continued)

OTHER PUBLICATIONS

Narten et al., "Neighbor Discovery for IP version 6 (IPv6)", RFC 4861, Network Working Group, Sep. 2007, pp. 1-97.
(Continued)

*Primary Examiner* — William Nealon
(74) *Attorney, Agent, or Firm* — Alston & Bird LLP

(57) ABSTRACT

A method and apparatus are provided for providing notification of a network access technology switching event. A method may include determining, at a communication device having an established connection to a network via a first network access technology and serving as a gateway to the network for a served device, that the connection between the communication device and the network is to be switched from the first network access technology to a second network access technology. The method may further include, responsive to the determination, causing a notification indicating that the served device will experience a network service disconnection to be provided prior to the connection between the communication device and the network being switched from the first network access technology to a second network access technology. A corresponding apparatus is also provided.

20 Claims, 10 Drawing Sheets

(51) Int. Cl.
*H04M 1/725* (2006.01)
*H04W 88/06* (2009.01)

(58) Field of Classification Search
USPC .............. 455/411, 552.1, 437; 370/331, 338
See application file for complete search history.

(56) References Cited

U.S. PATENT DOCUMENTS

| | | | | |
|---|---|---|---|---|
| 2008/0247359 | A1* | 10/2008 | Bengtsson | H04W 4/16 370/331 |
| 2010/0195562 | A1 | 8/2010 | Ishizu et al. | |
| 2010/0316021 | A1* | 12/2010 | Lerzer | H04W 88/06 370/331 |
| 2011/0044293 | A1* | 2/2011 | Nagasawa | H04M 1/2535 370/332 |
| 2011/0110332 | A1* | 5/2011 | Kim | H04W 36/0016 370/331 |
| 2011/0149928 | A1* | 6/2011 | Wu | H04L 12/66 370/338 |
| 2011/0283001 | A1 | 11/2011 | Jung et al. | |
| 2011/0316698 | A1 | 12/2011 | Palin et al. | |
| 2011/0320588 | A1 | 12/2011 | Raleigh | |
| 2013/0183932 | A1* | 7/2013 | Lemilainen | H04W 12/04 455/411 |
| 2014/0204758 | A1* | 7/2014 | Zhu | H04W 48/18 370/235 |

FOREIGN PATENT DOCUMENTS

| | | |
|---|---|---|
| EP | 2273821 A1 | 1/2011 |
| WO | 2006/002676 A1 | 1/2006 |
| WO | 2007/092670 A2 | 8/2007 |
| WO | 2011/002785 A1 | 1/2011 |

OTHER PUBLICATIONS

"Tethering", Wikipedia, Retrieved on Jan. 22, 2016, Webpage available at : https://en.wikipedia.org/wiki/Tethering.

"Wi-Fi", Wikipedia, Retrieved on Jan. 22, 2016, Webpage available at : https://en.wikipedia.org/wiki/Wi-Fi.

"Representational state transfer", Wikipedia, Retrieved on Feb. 11, 2016, Webpage available at : https://en.wikipedia.org/wiki/Representational_state_transfer.

"Dynamic Data Offloading : Connect Intelligently With ANDSF", Green Packet, Dec. 12, 2011, 20 pages.

"Managing Data Offloading Securely Over WLAN Access Networks With I-WLAN", Green Packet, Dec. 9, 2011, 19 pages.

Go et al., "A Disruption-Tolerant Transmission Protocol for Practical Mobile Data Offloading", Proceedings of the third ACM international workshop on Mobile Opportunistic Networks, Mar. 15-16, 2012, pp. 61-68.

"NSN Launches Smart WLAN Connectivity Solution to Seamlessly Transfer Mobile Broadband Traffic to WiFi Network", Telecom Pulse, Retrieved on Jan. 22, 2016, Webpage available at : https://telecomjunction.wordpress.com/2011/02/09/nsn-launches-smart-wlan-connectivity-solution-to-seamlessly-transfer-mobile-broadband-traffic-to-wifi-network/.

Extended European Search Report received for corresponding European Patent Application No. 12877794.3, dated Jan. 5, 2016, 12 pages.

International Search Report and Written Opinion received for corresponding Patent Cooperation Treaty Application No. PCT/IB2012/052725, dated May 30, 2013, 18 pages.

*XYFI—The Personal Media Hotspot* [online] [retrieved Aug. 11, 2016]. Retrieved from the Internet: <URL: http://products.option.com/xyfi/?page=home>. (2013) 4 pages.

*XYFI—The Personal Media Hotspot* [online] [retrieved Aug. 11, 2016]. Retrieved from the Internet: <URL: http://products.option.com/xyfi/?page=technical-specs>. (2013) 3 pages.

* cited by examiner

METHOD AND APPARATUS FOR PROVIDING NOTIFICATION OF A NETWORK ACCESS TECHNOLOGY SWITCHING EVENT

RELATED APPLICATION

This application was originally filed as Patent Cooperation Treaty Application No. PCT/IB2012/052725 filed May 30, 2012.

TECHNOLOGICAL FIELD

Example embodiments of the present invention relate generally to communications technology and, more particularly, relate to a method and apparatus for providing notification of a network access technology switching event.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds, and are used to communicate with other devices over mobile networks at a variety of locations.

Given the power and ubiquity of mobile computing devices, mobile computing devices now consume a large amount of network bandwidth, placing a burden on bandwidth-limited cellular networks. As the burden on cellular networks of handling the large data demands of modern mobile computing devices has grown and as network operators charge increasing data rates for data transfer on cellular networks, network operators and consumers have increasingly turned to a technology called "offloading" in order to reduce the network load burden on cellular networks and to reduce data costs charged to consumers. Offloading takes advantage of dual-mode communication devices that are capable of accessing a network via both a cellular access and a secondary access, such as a wireless local area network (WLAN) access, to send data over a network access other than the cellular network access when an alternative access is available to a mobile computing device.

BRIEF SUMMARY

A system, method, and apparatus are herein provided for providing notification of a network access technology switching event. Systems, methods, and apparatuses in accordance with various embodiments may provide several advantages to computing devices, computing device users, network operators, service providers, and consumers. In this regard, some example embodiments address a scenario in which a communication device may have an established connection to a network via a first network access technology while serving as a gateway to the network for a served device (for example, a tethered device). In such a scenario, if the connection between the communication device and the network is switched from the first network access technology to a second network access technology, such as in the case of offloading, the connection between the served device and the communication device may be terminated. As such, the served device may experience a network service disconnection as a result of the communication device's connection to the network being switched from the first network access technology to the second network access technology.

Some example embodiments mitigate, or even eliminate, the impact of a network service disconnection that might be suffered by a connected device to the connection between the serving gateway communication device and the network being switched from the first network access technology to the second network access technology. More particularly, some example embodiments provide a notification indicating that the served device will experience a network service disconnection to be provided prior to the connection between the communication device and the network being switched from the first network access technology to a second network access technology. For example, some example embodiments provide a notification to a user of the communication device. Accordingly, in such example embodiments, the user may select to decline or delay switching of the connection from the first network access technology to the second network access technology in order to mitigate the network service disconnection that might otherwise be experienced by a served device relying on the communication device serving as a gateway to the network. Additionally or alternatively, in some example embodiments, notification may be provided to the served device to enable the served device to prepare for a network service disconnection and/or find an alternative connection to the network prior to the serving gateway communication device switching from the first network access technology to a second network access technology.

In a first example embodiment, a method is provided, which may comprise determining, at a communication device having an established connection to a network via a first network access technology and serving as a gateway to the network for a served device, that the connection between the communication device and the network is to be switched from the first network access technology to a second network access technology. The method of this example embodiment may further comprise, responsive to the determination, causing a notification indicating that the served device will experience a network service disconnection to be provided prior to the connection between the communication device and the network being switched from the first network access technology to the second network access technology.

In a second example embodiment, an apparatus comprising at least one processor and at least one memory storing computer program code is provided. The at least one memory and stored computer program code may be configured, with the at least one processor, to cause the apparatus of this example embodiment to at least determine, at a communication device having an established connection to a network via a first network access technology and serving as a gateway to the network for a served device, that the connection between the communication device and the network is to be switched from the first network access technology to a second network access technology. The at least one memory and stored computer program code may be configured, with the at least one processor, to further cause the apparatus of this example embodiment, responsive to the determination, to cause a notification indicating that the served device will experience a network service disconnection to be provided prior to the connection between the communication device and the network being switched from the first network access technology to the second network access technology.

In a third example embodiment, an apparatus is provided that may comprise means for determining, at a communication device having an established connection to a network via a first network access technology and serving as a gateway to the network for a served device, that the connection between the communication device and the network is to be switched from the first network access technology to a second network access technology. The apparatus of this example embodiment may further comprise means for, responsive to the determination, causing a notification indicating that the served device will experience a network service disconnection to be provided prior to the connection between the communication device and the network being switched from the first network access technology to the second network access technology.

In a fourth example embodiment, a method is provided, which may comprise receiving, at a served device using a communication device as a gateway to a network, a notification originated by the communication device indicating that the served device will experience a network service disconnection resulting from a connection between the communication device and the network being switched from a first network access technology to a second network access technology. The method of this example embodiment may further comprise, responsive to the notification, taking action to mitigate impact of the network service disconnection.

In a fifth example embodiment, an apparatus comprising at least one processor and at least one memory storing computer program code is provided. The at least one memory and stored computer program code may be configured, with the at least one processor, to cause the apparatus of this example embodiment to at least receive, at a served device using a communication device as a gateway to a network, a notification originated by the communication device indicating that the served device will experience a network service disconnection resulting from a connection between the communication device and the network being switched from a first network access technology to a second network access technology. The at least one memory and stored computer program code may be configured, with the at least one processor, to further cause the apparatus of this example embodiment, responsive to the notification, to take action to mitigate impact of the network service disconnection.

In a sixth example embodiment, an apparatus is provided that may comprise means for receiving, at a served device using a communication device as a gateway to a network, a notification originated by the communication device indicating that the served device will experience a network service disconnection resulting from a connection between the communication device and the network being switched from a first network access technology to a second network access technology. The apparatus of this example embodiment may further comprise means for, responsive to the notification, taking action to mitigate impact of the network service disconnection.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1A:
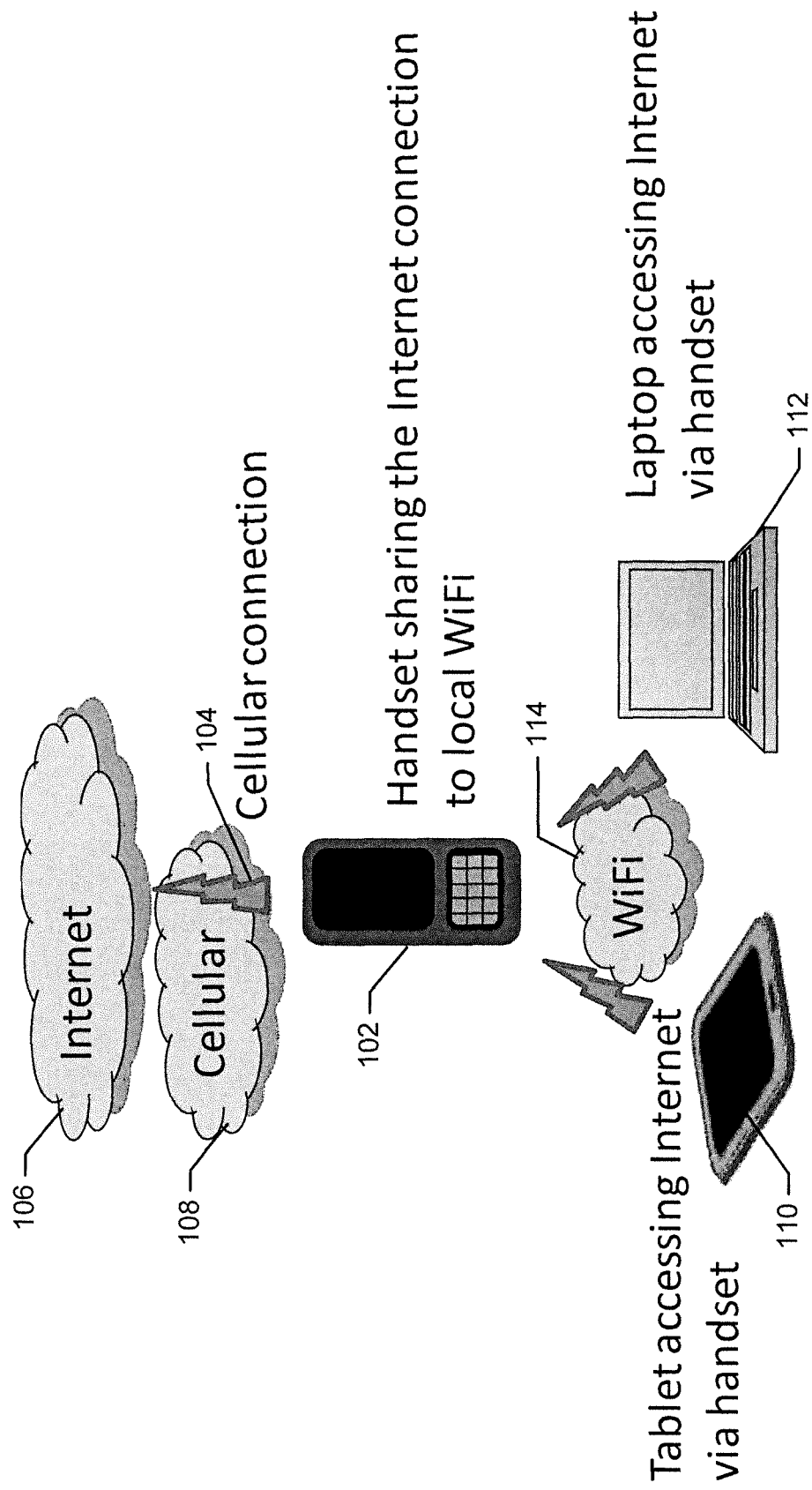
Figure 1B:
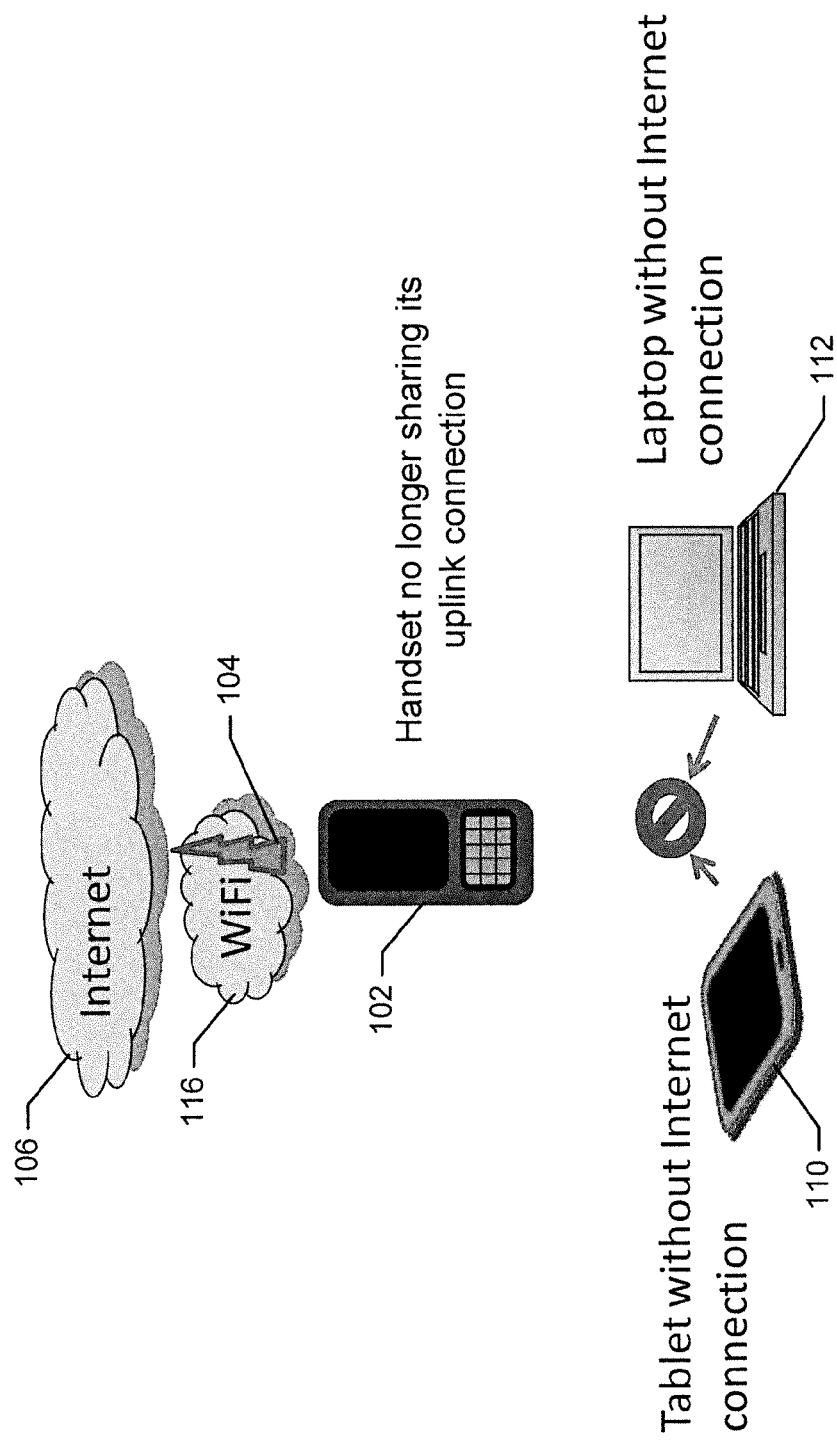
Figure 2:
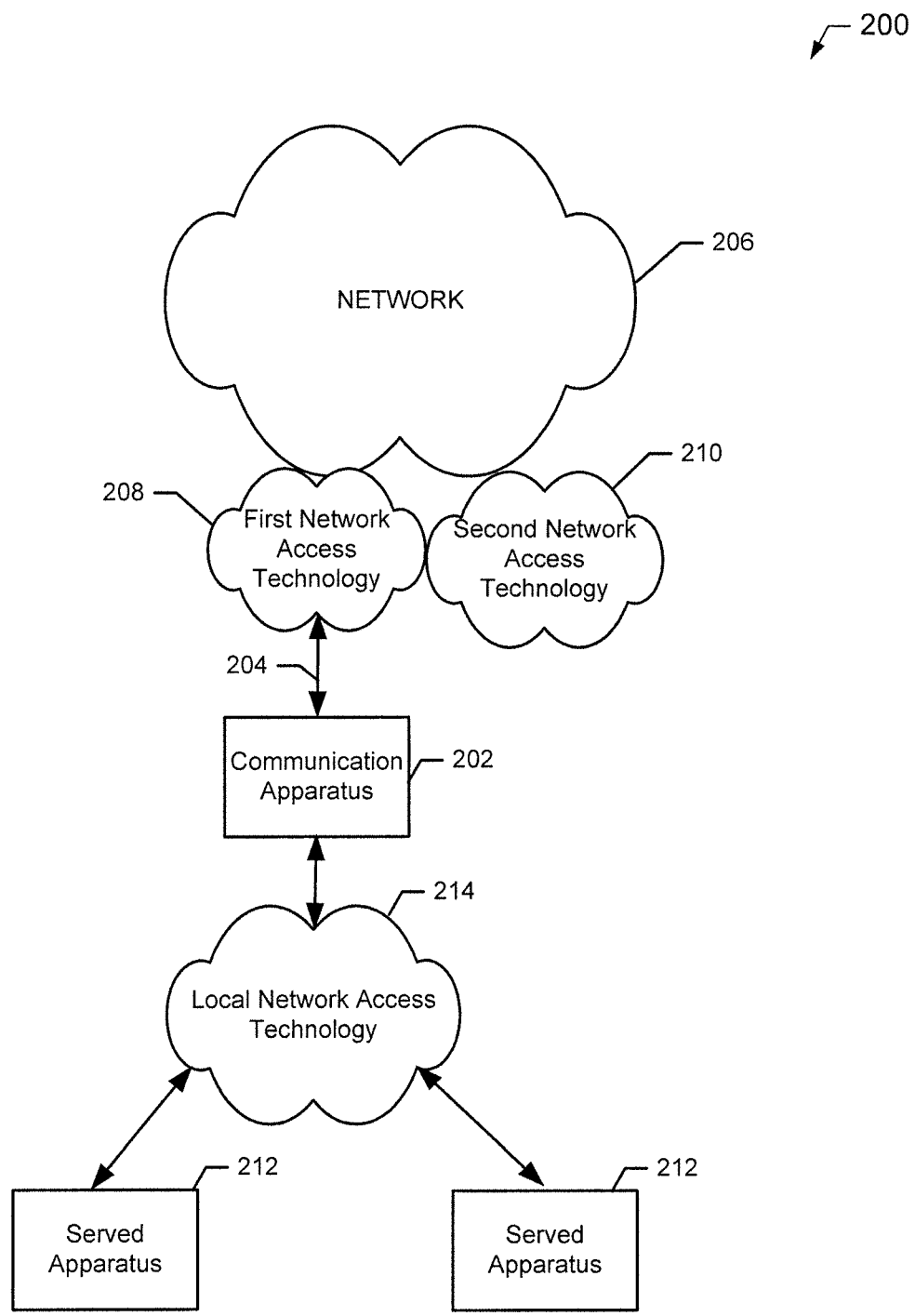
Figure 3:
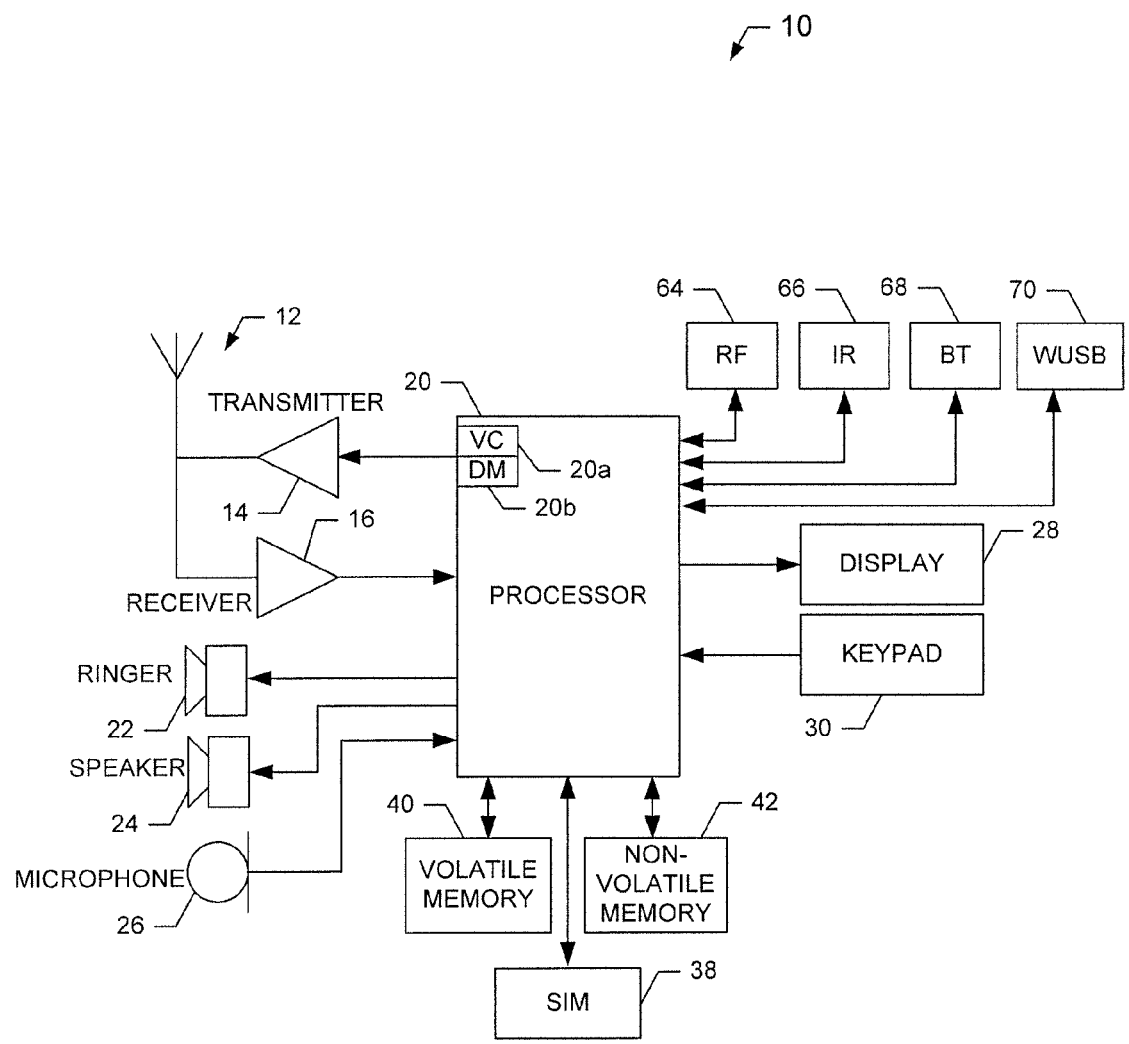
Figure 4:
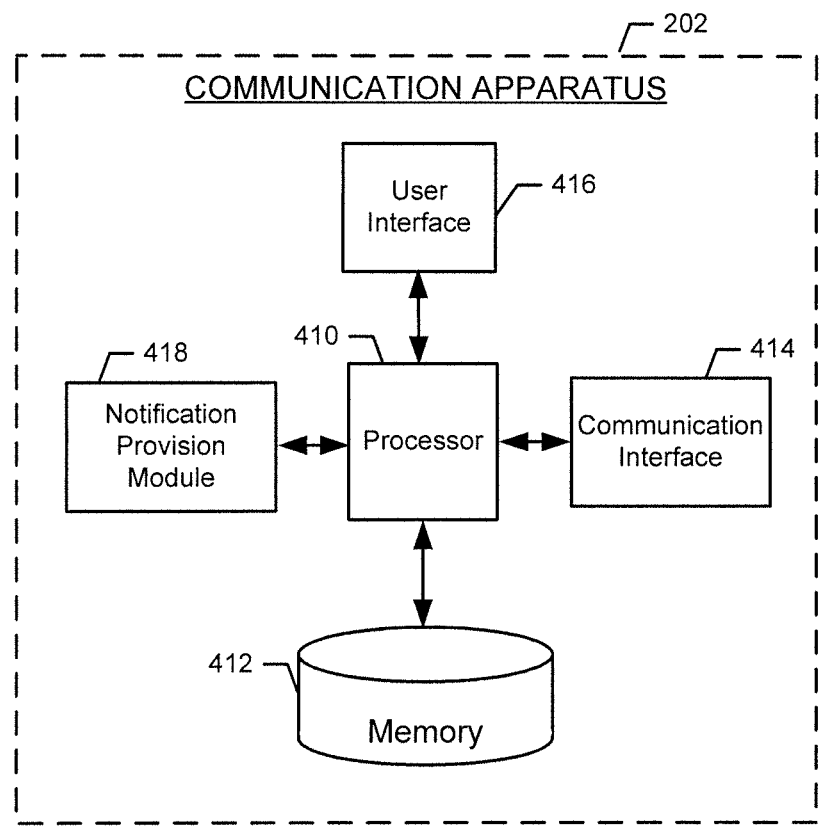
Figure 5:
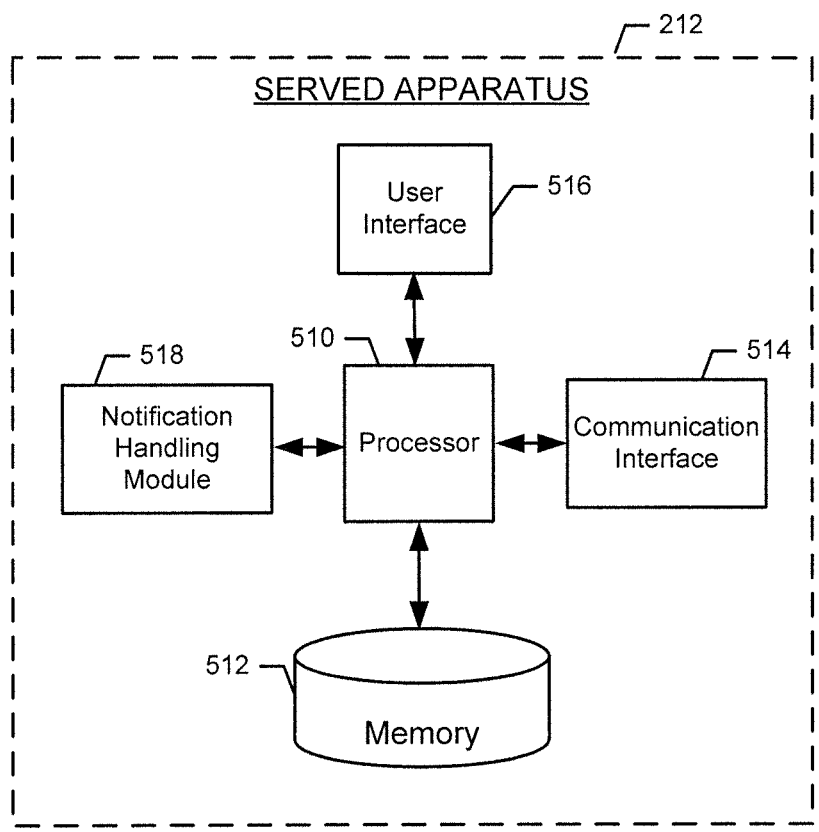
Figure 6:
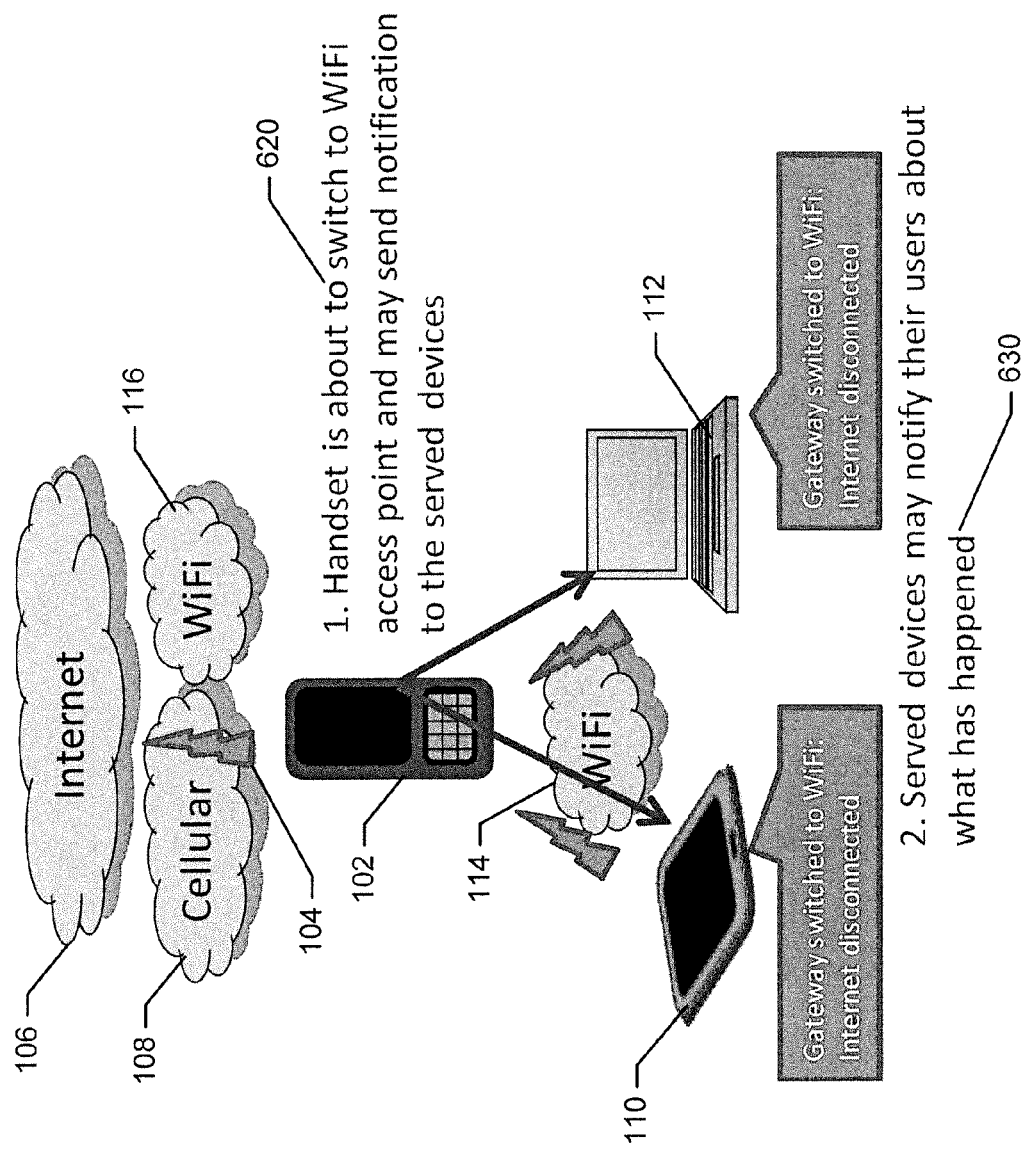
Figure 7:
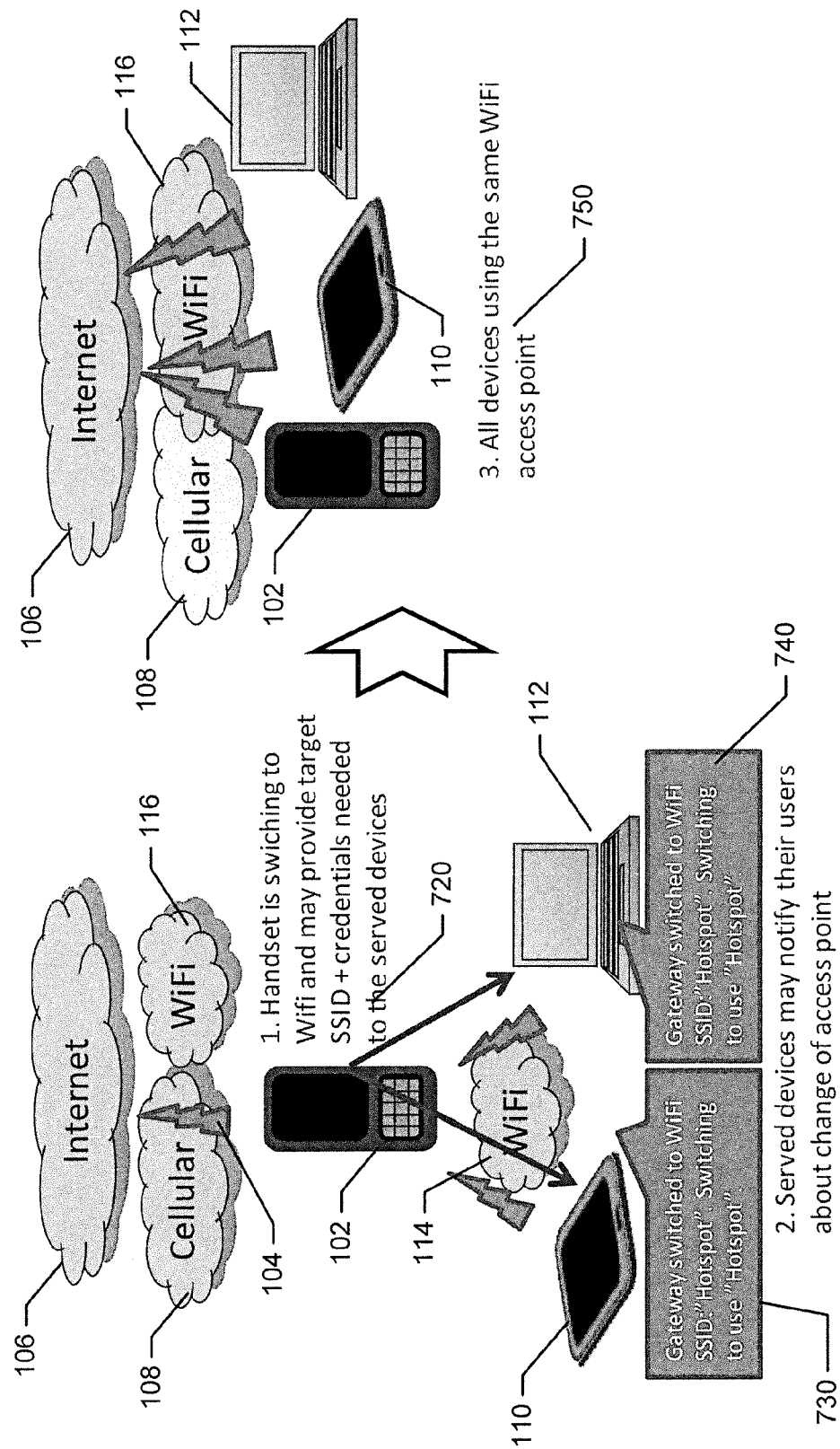
Figure 8:
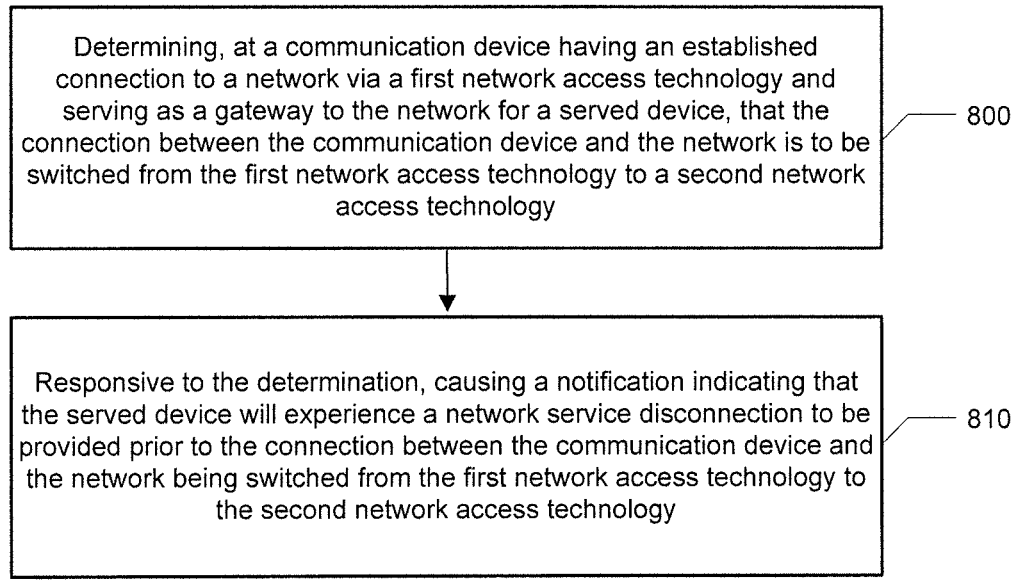
Figure 9:
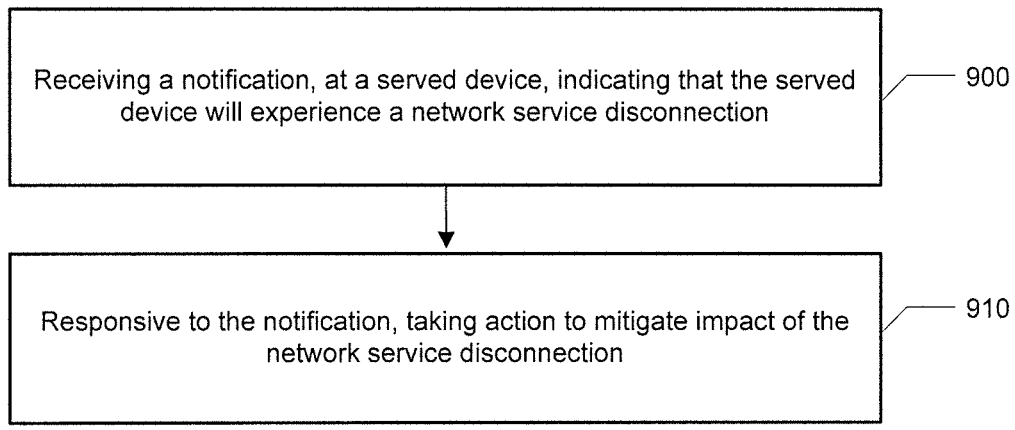

Having thus described example embodiments of the invention in general terms, reference will now be made to the accompanying drawings, which are not necessarily drawn to scale, and wherein:

FIGS. 1A-1B illustrate an example scenario that may be addressed by some example embodiments;

FIG. 2 illustrates a system for providing notification of a network access technology switching event according to some example embodiments;

FIG. 3 is a schematic block diagram of a mobile terminal according to some example embodiments;

FIG. 4 illustrates a block diagram of a communication apparatus according to some example embodiments;

FIG. 5 illustrates a block diagram of a served apparatus according to some example embodiments;

FIG. 6 illustrates an example application of some example embodiment to the scenario illustrated in FIGS. 1A and 1B;

FIG. 7 illustrates another example application of some example embodiment to the scenario illustrated in FIGS. 1A and 1B;

FIG. 8 illustrates a flowchart according to an example method for providing notification of a network access technology switching event according to some example embodiments; and FIG. 9 illustrates a flowchart according to another example method for providing notification of a network access technology switching event according to some example embodiment.

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from or send data to another computing device, it will be appreciated that the data may be received or sent directly from the another computing device or may be received or sent indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Some example embodiments address a scenario in which a communication device may have an established connection to a network via a first network access technology while serving as a gateway to the network for a served device (for example, a tethered device). In such a scenario, if the connection between the communication device and the network is switched from the first network access technology to a second network access technology, such as in the case of offloading, the connection between the served device and the communication device may be terminated. As such, the served device may experience a network service disconnection as a result of the communication device's connection to the network being switched from the first network access technology to the second network access technology.

FIGS. 1A and 1B illustrate an example of such a scenario. In the example of FIG. 1A, the mobile handset 102 has a connection 104 to the Internet 106 via a cellular network access 108. The cellular network access 108 may, for example, comprise a cellular network access using Third Generation Partnership Project (3GPP) technology. However, it will be appreciated that the cellular network access 108 may comprise a cellular network access using any type of cellular networking technology. The handset 102 may additionally be serving as a gateway to the Internet 106 for the served devices 110 and 112 via a local network access technology, such as the local Wi-Fi access 114. The served computing devices 110 and 112 may comprise any computing device that may be tethered to the mobile handset 102 to access the Internet 106 via the Wi-Fi access 114. By way of example, the served device 110 may be a tablet computing device, and the served device 112 may be a laptop computer.

The mobile handset 102 may be within range of an alternative access to the Internet 106. For example, the mobile handset 102 may be within range of the Wi-Fi access 116 illustrated in FIG. 1B. Due to user preference, network operator policy, and/or the like, the connection 104 between the mobile handset 102 and the Internet 106 may be switched from the cellular network access 108 to the Wi-Fi access 116. For example, the mobile handset 102 may drop its connection to the cellular network access 108 entirely in favor of a connection to the Wi-Fi access 116. Alternatively, as another example, the mobile handset 102 may maintain a connection to the cellular network access 108, but may offload a select data connection and/or select data traffic from the cellular network access 108 to a concurrent connection to the Wi-Fi access 116. As a result of the mobile handset 102 switching the connection 104 from the cellular network access 108 to the Wi-Fi access 116, the served devices 110 and 112 may experience a network service disconnection, and may lose their connection to the Internet 106, as illustrated in FIG. 1B. In this regard, if the mobile handset 102 switches from a cellular uplink to a Wi-Fi uplink, it may not be able to serve as a Wi-Fi access point for other devices, as if the mobile handset 102 is connected as a client to a Wi-Fi access point, it may not be able to act as a Wi-Fi access point for other devices. For example, the mobile handset 102 may only have a single Wi-Fi radio, and may not be able to support an uplink connection to a Wi-Fi access point concurrently with a downlink connection(s) to served devices.

Accordingly, the mobile handset 102 may not be able to serve as a gateway to the Internet 106 for the served devices 110 and 112 if the connection 104 between the mobile handset 102 and the Internet 106 is switched from the cellular network access 108 to the Wi-Fi access 116, as illustrated in FIG. 1B. Various example embodiments disclosed herein may mitigate the impact of a network service disconnection that may be suffered by a served device in such a situation by providing a notification indicating that a served device will experience a network service disconnection to be provided prior to the connection between a communication device, such as the mobile handset 102, serving as a gateway for the served device and the network, such as the Internet 106, being switched from a first network access technology, such as the cellular network access 108, to a second network access technology, such as the Wi-Fi access 116.

Referring now to FIG. 2, FIG. 2 illustrates a diagram of a system 200 for providing notification of a network access technology switching event according to some example embodiments. It will be appreciated that the system 200 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 2 illustrates one example of a configuration of a system for providing notification of a network access technology switching event, numerous other configurations may also be used to implement embodiments of the present invention.

In some example embodiments, the system 200 may comprise a communication apparatus 202. The communication apparatus 202 may comprise any computing device configured to establish a connection 204 to a network 206 and to serve as a gateway to the network 206 for one or more served apparatuses 212, such as via a local network access technology 214. In this regard, the communication apparatus 202 may be configured to provide tethered access to the network 206 and share the connection 204 with one or more served apparatuses 212. By way of non-limiting example, the communication apparatus 202 may comprise a mobile terminal, mobile computer, mobile phone, mobile communication device, tablet computing device, computer, laptop computer, game device, digital camera/camcorder, audio/video player, television device, radio receiver, digital video recorder, positioning device, wrist watch, portable digital assistant (PDA), a chipset, an apparatus comprising a chipset, any combination thereof, and/or the like.

A served apparatus 212 may comprise any computing device that may connect to a communication apparatus 202 via a local network access technology 214 to receive access to the network 206. By way of non-limiting example, a served apparatus 212 may comprise a mobile terminal, mobile computer, mobile phone, mobile communication device, tablet computing device, computer, laptop computer, game device, digital camera/camcorder, audio/video player, television device, radio receiver, digital video recorder, positioning device, wrist watch, portable digital assistant (PDA), a chipset, an apparatus comprising a chipset, any combination thereof, and/or the like.

The network 206 may comprise one or more wireless networks (for example, a cellular network, a structured wireless local area network, wireless metropolitan area network, and/or the like), one or more wireline networks, or some combination thereof, and in some embodiments may comprise at least a portion of the internet. The communication apparatus 202 may be configured to establish the connection 204 with the network 206 via any of a variety of network access technologies. In the example of FIG. 2, the communication apparatus 202 has a connection 204 with the network 206 via a first network access technology 208. However, the connection 204 may be switched from the first network access technology 208 to the second network access technology 210 in some example embodiments.

The first and second network access technologies 208 and 210 may comprise any wireless network access technologies that may be used to access the network 206. By way of non-limiting example, the first network access technology 208 may comprise a cellular network access technology, such as a cellular network access technology that may operate in accordance with a 3GPP standard and/or other present or future cellular networking standard. Accordingly, when establishing a connection 204 with the network 206 via the first network access technology 208, the communication apparatus 202 may establish a connection with a cellular network access point, such as a cellular base station, femtocell, nanocell, and/or the like. The second network access technology may comprise a proximity-based wireless communication technology. The proximity-based communications technology may comprise any wireless communications technology by which two or more computing devices may communicate when they are within a proximate range of each other (for example, within a communications or signaling range of the proximity-based communications technology). By way of non-limiting example, such proximity-based communications technology may comprise a network access technology implementing an Institute of Electrical and Electronics Engineers (IEEE) 802.11 standard (for example, Wi-Fi or other wireless local area network (WLAN) access technology), Bluetooth, a network access technology implementing any version of the IEEE 802.15 standard, ZigBee, Ultra-Wideband, any wireless personal area networking (PAN) technology, or the like. Accordingly, when establishing a connection 204 with the network 206 via the second network access technology 210, the communication apparatus 202 may establish a connection with a WLAN access point (for example, a hot spot) and/or other wireless network access point.

The local network access technology 214 may comprise any wireless local network access technology that may be used to facilitate communication between the communication apparatus 202 and one or more served apparatuses 212 so that the communication apparatus 212 may serve as a gateway to the network 206 for one or more served apparatuses 212. The local network access technology 214 may, for example, comprise a proximity-based communications technology. In this regard, in some example embodiments, the local network access technology 214 may comprise any wireless communications technology by which two or more computing devices may communicate when they are within a proximate range of each other (for example, within a communications or signaling range of the proximity-based communications technology). By way of non-limiting example, such proximity-based communications technology may comprise a network access technology implementing an IEEE 802.11 standard (for example, Wi-Fi or other WLAN access technology), Bluetooth, a network access technology implementing any version of the IEEE 802.15 standard, ZigBee, Ultra-Wideband, any wireless PAN technology, or the like.

According to some example embodiments, a communication apparatus 202 may be embodied as a mobile terminal, such as that illustrated in FIG. 3. In this regard, FIG. 3 illustrates a block diagram of a mobile terminal 10 representative of some embodiments of a communication apparatus 202. It should be understood, however, that the mobile terminal 10 illustrated and hereinafter described is merely illustrative of one type of computing device that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40, non-volatile memory 42 may also include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Referring now to FIG. 4, FIG. 4 illustrates a block diagram of a communication apparatus 202 according to some example embodiments. In some example embodiments, the communication apparatus 202 may include various means for performing the various functions herein described. These means may comprise one or more of a processor 410, memory 412, communication interface 414, user interface 416, or notification provision module 418. The means of the communication apparatus 202 as described herein may be embodied as, for example, circuitry, hardware elements (for example, a suitably programmed processor, combinational logic circuit, and/or the like), a computer program product comprising a computer-readable medium (for example memory 412) storing computer-readable program instructions (for example, software or firmware) that are executable by a suitably configured processing device (for example, the processor 410), or some combination thereof.

In some example embodiments, one or more of the means illustrated in FIG. 4 may be embodied as a chip or chip set. In other words, the communication apparatus 202 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 410, memory 412, communication interface 414, user interface 416, and/or notification provision module 418 may be embodied as a chip or chip set. The communication apparatus 202 may therefore, in some example embodiments, be configured to implement example embodiments of the present invention on a single chip or as a single "system on a chip." As another example, in some example embodiments, the communication apparatus 202 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 410 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some example embodiments the processor 410 may comprise a plurality of processors. The plurality of processors may be in operative communication with each other and may be collectively configured to perform one or more functionalities of the communication apparatus 202 as described herein. The plurality of processors may be embodied on a single computing device or distributed across a plurality of computing devices collectively configured to function as the communication apparatus 202. In embodiments wherein the communication apparatus 202 is embodied as a mobile terminal 10, the processor 410 may be embodied as or may comprise the processor 20. In some example embodiments, the processor 410 is configured to execute instructions stored in the memory 412 or otherwise accessible to the processor 410. These instructions, when executed by the processor 410, may cause the communication apparatus 202 to perform one or more of the functionalities of the communication apparatus 202 as described herein. As such, whether configured by hardware or software methods, or by a combination thereof, the processor 410 may comprise an entity capable of performing operations according to embodiments of the present invention while configured accordingly. Thus, for example, when the processor 410 is embodied as an ASIC, FPGA or the like, the processor 410 may comprise specifically configured hardware for conducting one or more operations described herein. Alternatively, as another example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. In this regard, the memory 412 may comprise a non-transitory computer-readable storage medium. Although illustrated in FIG. 4 as a single memory, the memory 412 may comprise a plurality of memories. The plurality of memories may be embodied on a single computing device or may be distributed across a plurality of computing devices collectively configured to function as the communication apparatus 202. In various example embodiments, the memory 412 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the communication apparatus 202 is embodied as a mobile terminal 10, the memory 412 may comprise the volatile memory 40 and/or the non-volatile memory 42. The memory 412 may be configured to store information, data, applications, instructions, or the like for enabling the communication apparatus 202 to carry out various functions in accordance with various example embodiments. For example, in some example embodiments, the memory 412 may be configured to buffer input data for processing by the processor 410. Additionally or alternatively, the memory 412 may be configured to store program instructions for execution by the processor 410. The memory 412 may store information in the form of static and/or dynamic information. This stored information may be stored and/or used by the notification provision module 418 during the course of performing its functionalities.

The communication interface 414 may be embodied as any device or means embodied in circuitry, hardware, a computer program product comprising a computer-readable medium (for example memory 412) storing computer-readable program instructions (for example, software or firmware) that are executable by a suitably configured processing device (for example, the processor 410), or a combination thereof that is configured to receive and/or transmit data from/to another computing device. According to some example embodiments, the communication interface 414 may be at least partially embodied as or otherwise controlled by the processor 410. In this regard, the communication interface 414 may be in communication with the processor 410, such as via a bus. The communication interface 414 may additionally be in communication with the memory 412, user interface 416, and/or notification provision module 418, such as via a bus(es). The communication interface 414 may include, for example, an antenna, a transmitter, a receiver, a transceiver and/or supporting hardware or software for enabling communications with one or more computing devices. The communication interface 414 may be configured to receive and/or transmit data using any protocol that may be used for communications between computing devices. In this regard, the communication interface 414 may be configured to receive and/or transmit data using any protocol that may be used for transmission of data over a wireless network, wireline network, some combination thereof, or the like by which the communication apparatus 202 and one or more computing devices or computing resources may be in communication. As an example, the communication interface 414 may be configured to support a connection 204 with the network 206 via the first network access technology 208 and/or via the second network access technology 210. As a further example, the communication interface 414 may be configured to enable communication between the communication apparatus 202 and one or more served apparatuses 212 via the local network access technology 214.

The user interface 416 may be in communication with the processor 410 to receive an indication of a user input and/or to provide an audible, visual, mechanical, or other output to a user. As such, the user interface 416 may include, for example, a keyboard, a mouse, a joystick, a display, a touch screen display, a microphone, a speaker, and/or other input/output mechanisms. In embodiments wherein the user interface 416 comprises a touch screen display, the user interface 416 may additionally be configured to detect and/or receive an indication of a touch gesture or other input to the touch screen display. The user interface 416 may be in communication with the memory 412, communication interface 414, and/or notification provision module 418, such as via a bus(es).

The notification provision module 418 may be embodied as various means, such as circuitry, hardware, a computer program product comprising a computer-readable medium (for example memory 412) storing computer-readable program instructions (for example, software or firmware) that are executable by a suitably configured processing device (for example, the processor 410), or some combination thereof and, in some example embodiments, may be embodied as or otherwise controlled by the processor 410. In embodiments wherein the notification provision module 418 is embodied separately from the processor 410, the notification provision module 418 may be in communication with the processor 410. The notification provision module 418 may further be in communication with one or more of the memory 412, communication interface 414, or user interface 416, such as via a bus(es).

FIG. 5 illustrates a block diagram of a served apparatus 212 according to some example embodiments. In some example embodiments, the served apparatus 212 may include various means for performing the various functions herein described. These means may comprise one or more of a processor 510, memory 512, communication interface 514, user interface 516, or notification handling module 518. The means of the served apparatus 212 as described herein may be embodied as, for example, circuitry, hardware elements (for example, a suitably programmed processor, combinational logic circuit, and/or the like), a computer program product comprising a computer-readable medium (for example, memory 512) storing computer-readable program instructions (for example, software or firmware) that are executable by a suitably configured processing device (for example, the processor 510), or some combination thereof.

In some example embodiments, one or more of the means illustrated in FIG. 5 may be embodied as a chip or chip set. In other words, the served apparatus 212 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 510, memory 512, communication interface 514, user interface 516, and/or notification handling module 518 may be embodied as a chip or chip set. The served apparatus 212 may therefore, in some example embodiments, be configured to implement example embodiments of the present invention on a single chip or as a single "system on a chip." As another example, in some example embodiments, the served apparatus 212 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 510 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 5 as a single processor, in some example embodiments the processor 510 may comprise a plurality of processors. The plurality of processors may be in operative communication with each other and may be collectively configured to perform one or more functionalities of the served apparatus 212 as described herein. The plurality of processors may be embodied on a single computing device or distributed across a plurality of computing devices collectively configured to function as the served apparatus 212. In some example embodiments, the processor 510 is configured to execute instructions stored in the memory 512 or otherwise accessible to the processor 510. These instructions, when executed by the processor 510, may cause the served apparatus 212 to perform one or more of the functionalities of the served apparatus 212 as described herein. As such, whether configured by hardware or software methods, or by a combination thereof, the processor 510 may comprise an entity capable of performing operations according to embodiments of the present invention while configured accordingly. Thus, for example, when the processor 510 is embodied as an ASIC, FPGA or the like, the processor 510 may comprise specifically configured hardware for conducting one or more operations described herein. Alternatively, as another example, when the processor 510 is embodied as an executor of instructions, such as may be stored in the memory 512, the instructions may specifically configure the processor 510 to perform one or more algorithms and operations described herein.

The memory 512 may comprise, for example, volatile memory, non-volatile memory, or some combination thereof. In this regard, the memory 512 may comprise a non-transitory computer-readable storage medium. Although illustrated in FIG. 5 as a single memory, the memory 512 may comprise a plurality of memories. The plurality of memories may be embodied on a single computing device or may be distributed across a plurality of computing devices collectively configured to function as the served apparatus 212. In various example embodiments, the memory 512 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 512 may be configured to store information, data, applications, instructions, or the like for enabling the served apparatus 212 to carry out various functions in accordance with various example embodiments. For example, in some example embodiments, the memory 512 may be configured to buffer input data for processing by the processor 510. Additionally or alternatively, the memory 512 may be configured to store program instructions for execution by the processor 510. The memory 512 may store information in the form of static and/or dynamic information. This stored information may be stored and/or used by the notification handling module 518 during the course of performing its functionalities.

The communication interface 514 may be embodied as any device or means embodied in circuitry, hardware, a computer program product comprising a computer-readable medium (for example memory 512) storing computer-readable program instructions (for example, software or firmware) that are executable by a suitably configured processing device (for example, the processor 510), or a combination thereof that is configured to receive and/or transmit data from/to another computing device. According to some example embodiments, the communication interface 514 may be at least partially embodied as or otherwise controlled by the processor 510. In this regard, the communication interface 514 may be in communication with the processor 510, such as via a bus. The communication interface 514 may additionally be in communication with the memory 512, user interface 516, and/or notification handling module 518, such as via a bus(es). The communication interface 514 may include, for example, an antenna, a transmitter, a receiver, a transceiver and/or supporting hardware or software for enabling communications with one or more computing devices. The communication interface 514 may be configured to receive and/or transmit data using any protocol that may be used for communications between computing devices. In this regard, the communication interface 514 may be configured to receive and/or transmit data using any protocol that may be used for transmission of data over a wireless network, wireline network, some combination thereof, or the like by which the served apparatus 212 and one or more computing devices or computing resources may be in communication. As an example, the communication interface 514 may be configured to support a connection with a communication apparatus 202 via the local network access technology 214 to enable the served apparatus 212 to use the communication apparatus 202 as a gateway to the network 206. In some example embodiments, the communication interface 514 may be configured to support a connection to the network 206 via the first network access technology 208 and/or via the second network access technology 210, and/or the like (for example, a connection to a network access point implementing the first network access technology 208 and/or via the second network access technology 210, and/or the like).

In some example embodiments, one or more aspects of the user interface 516 may be limited, or the user interface 516 may even be eliminated. In embodiments including the user interface 516, the user interface 516 may be in communication with the processor 510 to receive an indication of a user input and/or to provide an audible, visual, mechanical, or other output to a user. As such, the user interface 516 may include, for example, a keyboard, a mouse, a joystick, a display, a touch screen display, a microphone, a speaker, and/or other input/output mechanisms. In embodiments wherein the user interface 516 comprises a touch screen display, the user interface 516 may additionally be configured to detect and/or receive an indication of a touch gesture or other input to the touch screen display. The user interface 516 may be in communication with the memory 512, communication interface 514, and/or notification handling module 518, such as via a bus(es).

The notification handling module 518 may be embodied as various means, such as circuitry, hardware, a computer program product comprising a computer-readable medium (for example memory 512) storing computer-readable program instructions (for example, software or firmware) that are executable by a suitably configured processing device (for example, the processor 510), or some combination thereof and, in some example embodiments, may be embodied as or otherwise controlled by the processor 510. In embodiments wherein the notification handling module 518 is embodied separately from the processor 510, the notification handling module 518 may be in communication with the processor 510. The notification handling module 518 may further be in communication with one or more of the memory 512, communication interface 514, or user interface 516, such as via a bus(es).

In some example embodiments, if a second network access technology access is available to the communication apparatus 202, the connection 204 between the communication apparatus 202 and network 206 may optionally be switched from the first network access technology 208 to the second network access technology 210. Such a network access technology switching event may be performed in accordance with a user-specified preference policy; at the request of a user; in accordance with a network operator-defined policy; in accordance with a network-provisioned policy, such as may be provisioned by an Access Network Discovery and Selection Function (ANDSF); in accordance with a configuration of the communication apparatus 202, such as may be hardcoded or otherwise specified by a manufacturer of the communication apparatus 202 and/or specified by a software configuration of an operating system and/or other software that may be implemented on the communication apparatus 202; and/or the like. In some example embodiments, if the connection 204 is switched from the first network access technology 208 to the second network access technology 210, the connection to the first network access technology 208 may be dropped entirely in favor of a connection to the second network access technology 210. Additionally or alternatively, in some example embodiments, while the connection 204 may be switched from the first network access technology 208 to the second network access technology 210, the communication apparatus 202 may still maintain a connection to the cellular network access 108. In this regard, in some example embodiments, the communication apparatus 202 offload a select data connection and/or select data traffic from the first network access technology 208 to the second network access technology 210 while still maintaining a connection to the network 206 via the first network access technology 208.

In some instances, the communication apparatus 202 may have to drop the connection(s) via the local network access technology 214 to the served apparatus(es) 212 as a result of the connection 204 being switched from the first network access technology 208 to the second network access technology 210. Accordingly, the served apparatus(es) 212 may experience a network service disconnection, losing connection to the network 206. In this regard, if the communication apparatus 202 switches the connection 204 to an access point operating in accordance with the second network access technology, the communication apparatus 202 may not be able to continue to serve as an access point for a served apparatus 212. For example, in some example embodiments, the second network access technology 210 and the local network access technology 214 may use the same radio frequency network access technology, such as a WLAN access technology, and the communication interface 414 may not support multiple parallel connections via the second network access technology. Accordingly, in such example embodiments, the communication apparatus 202 may not be able to concurrently support both functioning as a client connected to an access point operating in accordance with the second network access technology 210 and serving as an access point for a served apparatus 212 via local network access technology 214. In this regard, in such example embodiments, the communication apparatus 202 may not be able to concurrently support both an uplink connection to an access point operating in accordance with the second network access technology 210 and a downlink connection to a served apparatus 212.

In some example embodiments, if the communication apparatus 202 is serving as a gateway to the network 206 for one or more served apparatuses 212 and the connection 204 is to be switched from the first network access technology 208 to the second network access technology 210, the notification provision module 418 may be configured to determine that a network access technology switching event is to occur while the communication apparatus 202 is serving as a gateway to the network 206 for a served apparatus 212. The notification provision module 418 of some example embodiments may be further configured, in response to a determination that the network access technology switching event is to occur while the communication apparatus 202 is serving as a gateway, to cause a notification indicating that the served device(s) 212 will experience a network service disconnection to be provided prior to the connection 204 between the communication device 202 and the network 206 being switched from the first network access technology 208 to the second network access technology 210.

In some example embodiments, the notification provision module 418 may be configured to determine whether the second network access technology conflicts with the local network access technology 214 prior to providing a notification. In this regard, if the second network access technology 210 and local network access technology 214 do not use the same access technology and/or the communication apparatus 202 may otherwise support concurrent connections to the network 206 via the second network access technology 210 and to one or more served apparatuses 212 via the local network access technology 214, the second network access technology 210 and local network access technology 214 may not be in conflict. Accordingly, a notification may not need to be provided in such instances. However, if the second network access technology 210 and local network access technology 214 are in conflict, such as in the example case where the the second network access technology 210 and local network access technology 214 use the same wireless access technology (for example, Wi-Fi) and the communication apparatus 202 only supports one connection at a time via the wireless access technology, the notification provision module 418 may determine to provide a notification.

The notification provision module 418 may be configured to provide any of a variety of notifications in various example embodiments. For example, in some example embodiments, the notification provision module 418 may be configured to cause a notification indicating that the served device(s) 212 will experience a network service disconnection as a result of the connection being switched to the second network access technology 210 to be provided via the user interface 416 so as to provide notice to a user of the communication apparatus 202. The notification may be provided by any output means that may be available via the user interface 416. For example, the notification may comprise a graphical notification that may be presented on a display of the user interface 416. Additionally or alternatively, the notification may comprise an audible notification that may be output on a speaker that may be included in the user interface 416. Accordingly, the user may, for example, prepare for the network service disconnection, such as by finding alternative network access for the served apparatus(es) 212.

In some example embodiments, a user of the communication apparatus 202 may be presented with an option to delay and/or prevent the connection 204 being switched from the first network access technology 208 to the second network access technology 210. Accordingly, in such example embodiments, the user may delay and/or prevent the connection switch from occurring so that the served apparatus(es) 212 does not experience a network service disconnection. For example, the user may be presented with an option, such as via a pop-up window or other graphical notification that may be presented on a display of the user interface 416, to permit or deny the connection 204 being switched from the first network access technology 208 to the second network access technology 210. In such example embodiments, the notification provision module 418 may be configured to prevent the connection from being switched from the first network access technology 208 to the second network access technology 210 unless a user selection permitting the connection switch is received. The user selection permitting the connection switch may, for example, comprise an explicit user selection of an option authorizing the connection to be switched. As another example, a user selection permitting the connection switch may comprise an implicit selection that may be determined in response to a lack of a user selection to deny or delay the connection switch, such as in embodiments wherein the user may be presented with a dialog indicating that the connection switch will be made unless the user selects to prevent (or delay) the connection switch within a defined period of time.

In some example embodiments, the notification provision module 418 may be configured to cause a notification that a served apparatus 212 will experience a network service disconnection to be provided to the served apparatus 212. This notification may, for example, comprise a dedicated message that may be sent directly to an intended destination served apparatus 212. Additionally or alternatively, the notification may be broadcast, such as via the local network access technology 214 connection, such that the notification may be received by any served apparatuses 212 that may be utilizing the communication apparatus 202 as a gateway to the network 206. A notification that may be provided to a served apparatus 212 in accordance with some example embodiments may, for example, include an indication of a time remaining until the network service disconnection to enable the served apparatus 212 to make timely preparations for the network service disconnection.

The notification handling module 518 may be configured to receive a notification of an impending network service disconnection that may be sent to a served apparatus 212 by the communication apparatus 202. The notification handling module 518 may be configured to take action to mitigate impact of the impending network service connection in response to receipt of the notification. For example, the notification handling module 518 may be configured to cause a notification to be provided to a user of the served apparatus 212, such as via the user interface 516, so that the user may find an alternative network connection and/or otherwise prepare for the network disconnection event. Additionally or alternatively, the notification handling module 518 may be configured to automatically identify an alternative network access in response to the notification.

In some example embodiments, the notification handling module 518 may be configured to reject and/or delay for some period of time switching of the connection 204 from the first network access technology 208 to the second network access technology 210. In this regard, the notification handling module 518 may be configured to cause the served apparatus 212 to send an override request to the communication apparatus 202, and the notification provision module 418 may be configured to delay and/or prevent the connection switch in response to the override request. In some such example embodiments, the notification handling module 518 may be configured to automatically determine to reject and/or delay the connection switch, such as if the served apparatus 212 is engaged in an ongoing data transfer or other sensitive data connection. Additionally or alternatively, in some such example embodiments, a user of the served apparatus 212 may be presented with an option to reject and/or delay the connection switch. The notification handling module 518 may accordingly be configured in some example embodiments to cause an override request to be sent to the communication apparatus 202 in response to a user request to reject and/or delay the connection switch.

FIG. 6 illustrates an example application of some example embodiment to the scenario illustrated in FIGS. 1A and 1B. In the example of FIG. 6, a notification provision module 418 that may be associated with the mobile handset 102 may determine that the connection 104 between the mobile handset 102 and the Internet 106 is to be switched from the cellular network access 108 to the Wi-Fi access 116 while serving as a gateway to the Internet 106 for the served devices 110 and 112. The notification provision module 418 may cause the mobile handset 102 to send a notification to the served devices 110 and 112 indicating that the served devices 110 and 112 will experience a network service disconnection, as illustrated by operation 620. Notification handling modules 518 that may be associated with the served devices 110 and 112 may receive the notification and notify users of the served devices 110 and 112 about the impending network service disconnection so that users of the served devices 110 and 112 will know that the connection will be terminated and/or why the connection was terminated, as illustrated by operation 630.

In some example embodiments, a notification of an impending network service disconnection that may be provided to a served apparatus 212 may include an identifier for an available access point, such as for an access point for the second network access technology 210 to which the connection 204 is being switched. For example, if the second network access technology 210 is a Wi-Fi, or other WLAN access, the notification may include a Service Set Identifier (SSID) for the network access point. In such embodiments, the notification handling module 518 may be configured to utilize the identifier for the access point to facilitate discovery of and/or connection to the access point.

As a further example, in some example embodiments, if the communication apparatus 202 may serve as a gateway to the network 206 to a served apparatus 212 via a network access technology other than the local network access technology 214 while being connected to the network 206 via the second network access technology 214, the notification provision module 418 may be configured to include an indication in a notification provided to the served apparatus 212 that the communication apparatus 202 may serves as a gateway via an alternative access technology. The notification may, for example, further include parameters for establishing a connection to the communication apparatus 202 via the alternative access technology. As an example, the local network access technology 214 may comprise Wi-Fi, but the communication apparatus 202 may be further configured to support a connection to a served apparatus 212 via Bluetooth. Accordingly, in such example embodiments, the notification provision module 418 may be configured to provide an indication to a served apparatus 212 that the served may establish a Bluetooth connection with the communication apparatus 202 so that the communication apparatus 202 may continue to serve as a gateway to the network 206 even after the connection 204 has been switched to the second network access technology 210.

In some example embodiments, the notification provision module 418 may be configured to cause the communication apparatus 202 to provide a served apparatus 212 with access credentials for an available access point, such as for an access point for the second network access technology 210 to which the connection 204 is being switched. The access credentials may, for example, be included in a notification of an impending network service disconnection that may be provided to a served apparatus 212. As another example, the access credentials may be provided to the served apparatus 212 in a separate communication. The access credentials may, for example, comprise a password, security key, user name, and/or other credential that may be needed to establish a connection with the access point. The notification handling module 518 may be configured to receive the access credentials and use the access credentials to facilitate establishment of a connection with the access point.

In some example embodiments, the notification provision module 418 may be configured to cause the communication apparatus 202 to securely pass the access credentials to the served apparatus 212. In this regard, the access credentials may comprise sensitive information that may be desired to be kept secret from unauthorized entities. As an example, the access credentials may be encrypted. As another example, the access credentials may be sent to the served apparatus 212 via a secure channel, such as a channel using Internet Protocol Security (IPSec) protocol, Transport Layer Security (TLS), a channel using a secure layer 2 specific signaling message, and/or the like. As still a further example, the communication apparatus 202 and served apparatus 212 may be configured to communicate with each other through use of Bluetooth. The notification provision module 418 and notification handling module 518 may, for example, be configured to use Bluetooth Subscriber Identity Module (SIM) access profile to provide the served apparatus 212 with access credential information to enable the served apparatus 212 to perform an authentication, such by way of non-limiting example an IEE 802.16u authentication, to a network access point.

FIG. 7 illustrates another example application of some example embodiment to the scenario illustrated in FIGS. 1A and 1B. In the example of FIG. 7, a notification provision module 418 that may be associated with the mobile handset 102 may determine that the connection 104 between the mobile handset 102 and the Internet 106 is to be switched from the cellular network access 108 to the Wi-Fi access 116 while the mobile handset 102 is serving as a gateway to the Internet 106 for the served devices 110 and 112. The notification provision module 418 may cause the mobile handset 102 to send a notification to the served devices 110 and 112 indicating that the served devices 110 and 112 will experience a network service disconnection, as illustrated by operation 620. The notification may include the SSID and/or access credentials for an access point that may be associated with the Wi-Fi access 116. Notification handling modules 518 that may be associated with the served devices 110 and 112 may receive the notification and notify users of the served devices 110 and 112 about the impending network service disconnection so that users of the served devices 110 and 112 will know that the connection will be terminated and/or why the connection was terminated. As illustrated by operation 730, a notification handling module 518 that may be associated with the served device 110 may use the SSID and/or access credentials that may be included in the notification to discover and connect to the access point "Hotspot" that may be associated with the Wi-Fi access 116. Similarly, a notification handling module 518 that may be associated with the served device 112 may use the SSID and/or access credentials that may be included in the notification to discover and connect to the access point "Hotspot" that may be associated with the Wi-Fi access 116, as illustrated by operation 740. As illustrated in operation 750, the mobile handset 102, served device 110, and served device 112 may each establish a connection to the Internet 106 via the Wi-Fi access 116. Accordingly, the effect of the network service disconnection resulting from the network access technology switching event may be mitigated through provision of a notification to the served devices that includes information for discovering and connecting to the access point "Hotspot."

A notification may be provided to the served apparatus(es) 212 via any of a variety of protocols. By way of non-limiting example, the notification may be provided using Internet Control Message Protocol (ICMP), including ICMP version 4 (ICMPv4), ICMP version 6 (ICMPv6) and/or any present or future ICMP version; an application layer message on top of UDP (User Datagram Protocol), such as Universal Plug and Play protocol (UPnP), Constrained Application Protocol (CoAP), and/or the like; and/or the like.

As an example, an ICMP message, such as an ICMP router advertisement, may be used to convey the notification. In this regard, some example embodiments define a new option. The option may be included in periodic Router Advertisements with status "OK," but in an instance in which the notification provision module 418 determines that the connection 204 is to be switched from the first network access technology 208 to the second network access technology 210 while the communication apparatus 202 is serving as a gateway to the network 206 for a served apparatus 212, the status may indicate the intent of the router (for example, the communication apparatus 202 serving as gateway) to switch connection. The router advertisement status option provided in accordance with some example embodiments may, for example, be defined as follows:

| Name: | Router Status |
|---|---|
| Function: | This option provides information about router status that may be of use for hosts served by the router |

Message format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |U|          Reserved           |
+-+-+-+-+-+-+-+-+-+-+-+-+-+-+-+-+-+-+-+-+-+-+-+-+-+-+-+-+-+-+-+-+
|          Status               |           Substatus           |
+-+-+-+-+-+-+-+-+-+-+-+-+-+-+-+-+-+-+-+-+-+-+-+-+-+-+-+-+-+-+-+-+
```

Explanations:

| Type: | Type value (that would have to be) assigned for IANA for Router Status option |
|---|---|
| Length: | 8 bit unsigned integer describing length of the option |
| U: | Indicates if router has functioning uplink Internet connection |
| Reserved: | Reserved for future |

| | |
|---|---|
| Status: | 16-bit field to describe high level status of the router, such as:<br>0: OK<br>1: DISCONNECTED from Internet<br>2: DISCONNECTING from Internet<br>3: TERMINATING service |
| Substatus: | 16-bit field to describe in more detail the status field, such as:<br>0: OK<br>1: Lost uplink<br>2: Changing uplink connection<br>3: Low battery |

It will be appreciated, however, that the above example option is provided by way of example, and not by way of limitation. In this regard, alternative option formats are contemplated within the scope of the disclosure. For example, in some example embodiments, an ICMP message may include an indication of a time remaining until the served device will experience a network service disconnection. In this regard, an ICMP message may, in some example embodiments, include a field indicating a time (e.g., in milliseconds, seconds, or some other unit of time) until the served device will experience a network service disconnection.

As a further example, some example embodiments define an ICMP message to enable the communication apparatus 202 to indicate the intent of the router (for example, a communication apparatus 202 serving as a gateway for a served apparatus 212) to switch to the second network access technology 210 and an ICMP message to enable a served apparatus 212 to respond to a notification received from the communication apparatus 202, such as with an override request. In some embodiments, an ICMP Router Status Report message may be defined that may, for example, contain status information substantially similar to that contained in the above example ICMP Router Advertisement. Furthermore, in some embodiments, an ICMP Router Status Request message may be defined to allow served apparatuses 212 to send an override request requesting a communication apparatus 202 to stop or delay from switching network connection and hence causing served apparatuses to experience a network service disconnection. In some example embodiments in which a notification handling module 518 associated with a served apparatus 212 is configured to send an ICMP message, such as an ICMP Router Status Request message, requesting that a communication apparatus 202 stop or delay from switching network connection, the notification provision module 418 associated with the communication apparatus 202 may be configured to send an ICMP message, such as an ICMP Router Report, in response to indicate a response to the served apparatus's request. The response may, for example, include an indication of whether switching of the network connection has been stopped, whether switching of the network connection has been delayed, how long switching of the network connection has been delayed, and/or the like.

As another example, a Representational State Transfer (REST) Application Programming Interface (API) may be used to provide a notification to a served apparatus 112 in some example embodiments. In some example embodiments, a REST API may be defined on top of CoAP to enable a notification to be broadcast and/or multicast to served apparatuses 112 that may be served by a communication apparatus 202. In this regard, CoAP may not require a Transmission Control Protocol connection to be setup between the communication apparatus 202 and the served apparatus(es) 212. Accordingly, a single multicast CoAP message may, for example, be multicast using a UDP message, which may, for example, contain a Universal Resource Locator (URL) indicating that the connection between the communication apparatus 202 and the network 206 is to be switched to another network access and/or that the served apparatus 212 will experience a network service disconnection. For example, the communication apparatus 202 may send a multicast CoAP GET/PUT/POST message to URL coap://[multicast address]:5683/gatewayupdate with information indicating that the connection between the communication apparatus 202 and the network 206 is to be switched to another network access and/or that the served apparatus 212 will experience a network service disconnection. For example, a message may be sent as follows: coap://[multicast address]:5683/gatewayupdate?status=changingwanconnection&newssid="hotspot"&user name="foo"&password="bar". In addition to status information (for example, "changingwanconnection"), the message may include indication indicative of an SSID or other identifier for an accessible access point (for example, "hotspot"), network access credential information (for example, username "foo," password "bar," and/or the like), and/or other information that may facilitate network access point discovery and/or connection establishment by the served apparatus 212.

In some example embodiments, if the communication apparatus 202 moves outside of range of an access point for the second network access technology 210 and/or a connection to the network 206 via the second network access technology 210 otherwise becomes unavailable, the communication apparatus 202 may switch the connection 204 back to the first network access technology 208. The communication apparatus 202 may subsequently return to serving as a gateway to the network 206 for a served apparatus(es) 212 via the local network access technology 214.

FIG. 8 illustrates a flowchart according to an example method for providing notification of a network access technology switching event according to some example embodiments. In this regard, FIG. 8 illustrates operations that may be performed at a communication apparatus 202. The operations illustrated in and described with respect to FIG. 8 may, for example, be performed by, with the assistance of, and/or under the control of one or more of the processor 410, memory 412, communication interface 414, user interface 416, or notification provision module 418. Operation 800 may comprise determining, at a communication device having an established connection to a network via a first network access technology and serving as a gateway to the network for a served device, that the connection between the communication device and the network is to be switched from the first network access technology to a second network access technology. The processor 410, memory 412, communication interface 414, and/or notification provision module 418 may, for example, provide means for performing operation 800. Operation 810 may comprise, responsive to the determination, causing a notification indicating that the served device will experience a network service disconnection to be provided prior to the connection between the communication device and the network being switched from the first network access technology to the second network access technology. For example, operation 810 may comprise causing a notification to be provided to a user of the communication apparatus. Additionally or alternatively, as another example, operation 810 may comprise causing a notification to be provided to the served apparatus(es). The processor 410, memory 412, communication interface 414, user interface 416, and/or notification provision module 418 may, for example, provide means for performing operation 810.

FIG. 9 illustrates a flowchart according to another example method for providing notification of a network access technology switching event according to some example embodiments. In this regard, FIG. 9 illustrates operations that may be performed at a served apparatus 212. The operations illustrated in and described with respect to FIG. 9 may, for example, be performed by, with the assistance of, and/or under the control of one or more of the processor 510, memory 512, communication interface 514, user interface 516, or notification handling module 418. Operation 900 may comprise receiving a notification at a served device using a communication apparatus as a gateway to a network that the served device will experience a network service disconnection. The processor 510, memory 512, communication interface 514, and/or notification handling module 518 may, for example, provide means for performing operation 900. Operation 910 may comprise, responsive to the notification, taking action to mitigate impact of the network service disconnection. For example, operation 910 may comprise notifying a user of the impending network service disconnection. Additionally or alternatively, operation 910 may, for example, comprise causing an override request to be sent to the communication apparatus serving as a gateway to request that a switching of a connection between the communication apparatus and the network from a first network access technology to a second network access technology be delayed or prevented. As still a further example, operation 910 may comprise identifying an alternative network access, such as based at least in part on information that may be included in the received notification. The processor 510, memory 512, communication interface 514, user interface 516, and/or notification handling module 518 may, for example, provide means for performing operation 910.

FIGS. 8-9 illustrate flowcharts of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 412, memory 512, and/or the like) and executed by a processor in the computing device (for example, by the processor 410, processor 510, and/or the like). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a communication apparatus 202, served apparatus 212, and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a communication apparatus 202, served apparatus 212, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 410, processor 510, and/or the like) may provide all or a portion of the elements. In other example embodiments, all or a portion of the elements may be configured by and operate under control of a computer program product. The computer program product for performing the methods of some example embodiments may include a computer-readable storage medium (for example, the memory 412, memory 512, and/or the like), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining, at a communication device having an established connection to a network via a first network access technology and serving as a gateway to the network for a served device, that the connection between the communication device and the network is to be switched from the first network access technology to a second network access technology, wherein the connection between the communication device and the network is to be switched to an access point using the second network access technology;
   responsive to the determination, causing a notification in a form of an indication indicating that the served device will experience a network service disconnection to be provided prior to the connection between the communication device and the network being switched from the first network access technology to the second network access technology, wherein the indication comprises a time remaining until the served device will experience the network service disconnection, and the indication further comprises a graphical or audible notification; and
   causing network access credentials for connecting to the access point to be provided to the served device.

2. The method of claim 1, wherein the communication device is serving as a gateway to the network for the served device via a connection between the communication device and the served device using the second network access technology.

3. The method of claim 2, wherein the communication device does not support simultaneous usage of the second network access technology to both connect to the network and to connect to the served device.

4. The method of claim 1, wherein the first network access technology comprises a cellular network access technology, and wherein the second network access technology comprises a proximity-based wireless communication technology.

5. The method of claim 4, wherein causing the notification to be provided via the user interface of the communication device comprises causing presentment of an option enabling a user of the communication device to select to permit or deny the connection between the communication device and the network to be switched from the first network access technology to the second network access technology, the method further comprising causing the connection between the communication device and the network to be switched from the first network access technology to the second network access technology only in an instance in which a user selection permitting the connection to be switched is received.

6. The method of claim 1, wherein causing the notification indicating that the served device will experience a network service disconnection to be provided comprises causing a notification to be provided to the served device.

7. The method of claim 6, wherein causing the notification to be provided comprises causing an Internet Control Message Protocol (ICMP) message indicating that the served device will experience a network service disconnection to be provided to the served device.

8. The method of claim 6, wherein causing the notification to be provided comprises causing a Constrained Application Protocol (CoAP) message indicating that the served device will experience a network service disconnection to be provided to the served device.

9. The method of claim 1, wherein the connection between the communication device and the network is to be switched to an access point using the second network access technology, the method further comprising causing an identifier for the access point to be provided to the served device.

10. The method of claim 1, wherein causing the network access credentials to be provided to the served device comprises causing secure passing of the network access credentials to the served device.

11. An apparatus comprising at least one processor and at least one memory storing computer program code, wherein the at least one memory and stored computer program code are configured, with the at least one processor, to cause the apparatus to at least:
   determine, at the apparatus having an established connection to a network via a first network access technology and serving as a gateway to the network for a served device, that the connection between the apparatus and the network is to be switched from the first network access technology to a second network access technology, wherein the connection between the apparatus and the network is to be switched to an access point using the second network access technology;
   responsive to the determination, cause a notification in a form of an indication indicating that the served device will experience a network service disconnection to be provided prior to the connection between the apparatus and the network being switched from the first network access technology to the second network access technology, wherein the indication comprises a time remaining until the served device will experience the network service disconnection, and the indication further comprises a graphical or audible notification; and
   cause network access credentials for connecting to the access point to be provided to the served device.

12. The apparatus of claim 11, wherein the apparatus is serving as a gateway to the network for the served device via a connection between the apparatus and the served device using the second network access technology.

13. The apparatus of claim 12, wherein the apparatus does not support simultaneous usage of the second network access technology to both connect to the network and to connect to the served device.

14. The apparatus of claim 11, wherein the first network access technology comprises a cellular network access technology, and wherein the second network access technology comprises a proximity-based wireless communication technology.

15. The apparatus of claim 14, wherein the at least one memory and stored computer program code are configured, with the at least one processor, to further cause the apparatus to:
   cause the notification to be provided via the user interface of the apparatus at least in part by causing presentment of an option enabling a user of the apparatus to select to permit or deny the connection between the apparatus and the network to be switched from the first network access technology to the second network access technology; and cause the connection between the apparatus and the network to be switched from the first network access technology to the second network access technology only in an instance in which a user selection permitting the connection to be switched is received.

16. The apparatus of claim 11, wherein the at least one memory and stored computer program code are configured, with the at least one processor, to further cause the apparatus to cause the notification indicating that the served device will experience a network service disconnection to be provided at least in part by causing a notification to be provided to the served device.

17. The apparatus of claim 16, wherein the at least one memory and stored computer program code are configured, with the at least one processor, to further cause the apparatus to cause the notification to be provided at least in part by causing an Internet Control Message Protocol (ICMP) message indicating that the served device will experience a network service disconnection to be provided to the served device.

18. The apparatus of claim 16, wherein the at least one memory and stored computer program code are configured, with the at least one processor, to further cause the apparatus to cause the notification to be provided at least in part by causing a Constrained Application Protocol (CoAP) message indicating that the served device will experience a network service disconnection to be provided to the served device.

19. The apparatus of claim 11, wherein the connection between the apparatus and the network is to be switched to an access point using the second network access technology, and wherein the at least one memory and stored computer program code are configured, with the at least one processor, to further cause the apparatus to cause an identifier for the access point to be provided to the served device.

20. The apparatus of claim 11, wherein the at least one memory and stored computer program code are configured, with the at least one processor, to further cause the apparatus to cause the network access credentials to be provided to the served device at least in part by causing secure passing of the network access credentials to the served device.

* * * * *